US012811341B2

(12) United States Patent
LaPalme et al.

(10) Patent No.: US 12,811,341 B2
(45) Date of Patent: Nov. 24, 2026

(54) ENHANCED RETENTION FORCE DEVICE

(71) Applicant: DISH Network L.L.C., Englewood, CO (US)

(72) Inventors: Jerome A. LaPalme, Aurora, CO (US); Henry Gregg Martch, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 399 days.

(21) Appl. No.: 18/626,188

(22) Filed: Apr. 3, 2024

(65) Prior Publication Data

US 2024/0339783 A1 Oct. 10, 2024

Related U.S. Application Data

(60) Provisional application No. 63/494,189, filed on Apr. 4, 2023.

(51) Int. Cl.
*H01R 13/627* (2006.01)

(52) U.S. Cl.
CPC ................................ *H01R 13/6272* (2013.01)

(58) Field of Classification Search
CPC ........................ H01R 13/6272; H01R 13/6275
USPC ........................................................... 439/352
See application file for complete search history.

(56) References Cited

U.S. PATENT DOCUMENTS 7,033,218 B2 * 4/2006 Huang ............... H01R 13/6275 439/353
7,494,374 B2 * 2/2009 Hall ....................... H01R 24/52 439/97
2003/0157836 A1 * 8/2003 Morikawa .......... H01R 13/6275 439/607.41
2006/0148300 A1 * 7/2006 Huang ............... H01R 13/6275 439/353
2015/0162709 A1 * 6/2015 Shen .................. H01R 13/6272 439/352
2015/0340796 A1 * 11/2015 Lu .......................... H01R 24/60 439/352
2023/0118800 A1 * 4/2023 Nakano .............. H01R 13/6215 439/352
2023/0144954 A1 * 5/2023 Steube ................... H01R 12/57 439/352

(Continued)

*Primary Examiner* — Harshad C Patel
(74) *Attorney, Agent, or Firm* — Kilpatrick Townsend & Stockton LLP

(57) ABSTRACT

The present disclosure describes technologies relating to connector retention devices, receptacles with retention enhancement features, systems including the same, and method of using thereof. In exemplary embodiments, a connector retention device, including a retention clip sized and configured to engage a USB receptacle including a frame panel; a pair of opposed sidewall engaging panels extending orthogonally from the frame panel each positioned to closely confront a corresponding side portion of the USB receptacle; a spring tab including a proximal end portion connected to the frame panel and a distal end portion having a pair of protrusions each positioned to engage a corresponding spring finger of the USB receptacle; and a lever arm pivotably coupled to the spring tab; and a button component attached to the frame panel and positioned to actuate the lever arm thereby deflecting the spring tab to move the protrusions away from the spring fingers.

14 Claims, 11 Drawing Sheets

(56) References Cited

U.S. PATENT DOCUMENTS

2023/0246382 A1* 8/2023 Henry ................ H01R 13/6273
439/352

* cited by examiner

ENHANCED RETENTION FORCE DEVICE

CROSS-REFERENCE TO RELATED APPLICATION

This patent application claims the benefit of and priority to U.S. Provisional Patent Application No. 63/494,189, filed Apr. 4, 2023, the disclosure of which is incorporated herein by reference by its entirely.

TECHNICAL FIELD

This patent application is directed to electrical and/or signal connections, and more specifically, to enhancing retention force to improve the quality and reliability of such connections.

BACKGROUND

A universal serial bus (USB) based accessory inserted into a piece of electrical equipment is held in place by the low friction forces between the mating components of the interface connection (e.g., a thumb drive inserted into a computer via a USB port). Occasionally the electrical connection is interrupted due to the dis-engaging of the connection caused by vibration, un-intended contact, and the like.

SUMMARY

In some aspects, the techniques described herein relate to a connector retention device, including: a retention clip sized and configured to engage a USB receptacle, including: a frame panel; a pair of opposed sidewall engaging panels extending orthogonally from the frame panel, each positioned to closely confront a corresponding side portion of the USB receptacle; and a spring tab, including: a retention arm including a proximal end portion and a distal end portion, wherein the proximal end portion is connected to the frame panel; and the distal end portion has a pair of protrusions each positioned to engage a corresponding spring finger of the standard USB connector; and a lever arm pivotably coupled to the retention arm; and a button component attached to the frame panel and positioned to actuate the lever arm thereby deflecting the retention arm to move the protrusions away from the spring fingers.

In some aspect, the techniques described herein relate to a USB receptacle, including: an outer shell housing including a bottom panel including a pair of spring fingers; and a top panel including a spring tab, the spring tab including a retention arm including a proximal end portion and a distal end portion, wherein the proximal end portion is connected to the top panel; and the distal end portion has a pair of protrusions each being configured to engage an aperture of a USB plug connector thereby locking the USB plug connector in the USB receptacle; and a lever arm pivotably coupled to the retention arm to facilitate unlocking the plug connector by pivoting the retention arm to disengage the protrusions from the apertures when actuated.

BRIEF DESCRIPTION OF THE DRAWINGS

The devices, systems, and methods described herein may be better understood by referring to the following Detailed Description in conjunction with the accompanying drawings, in which like reference numerals indicate identical or functionally similar elements.

Figure 1:
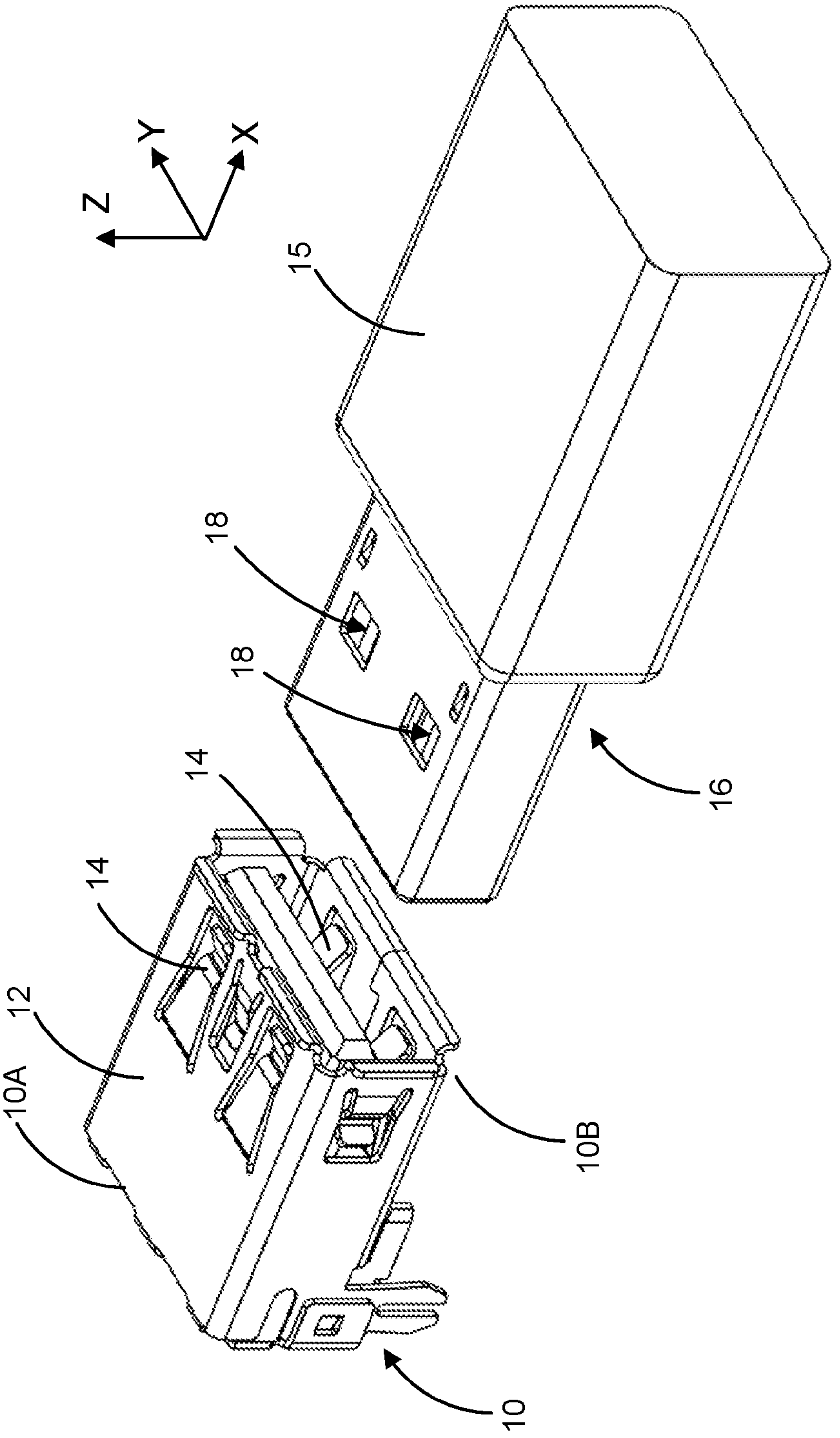
FIG. 1 is an isometric view illustrating a conventional USB type A receptacle and a mating plug connector.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the technology introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

The disclosed technology is directed to a clip (or referred to as a connector retention device, a retention clip, or an enhanced retention force device) configured to mate to an existing receptacle (e.g., a standard USB receptacle). The clip can include a spring member (e.g., a spring tab) with protrusions that nest into existing pressure tabs of the receptacle. The spring resists movement of the pressure tabs thereby enhancing the retention force of the receptacle. The spring member can include a release lever (e.g., a lever arm) that pivots the protrusions away from the pressure tabs when actuated. In some embodiments, a button is secured to the clip that actuates the release lever when manually pressed. In some embodiments, similar retention enhancement features of the retention clip may be incorporated into an outer shell of a receptacle, such as more aggressive barb-like retaining tabs.

Figure 6:
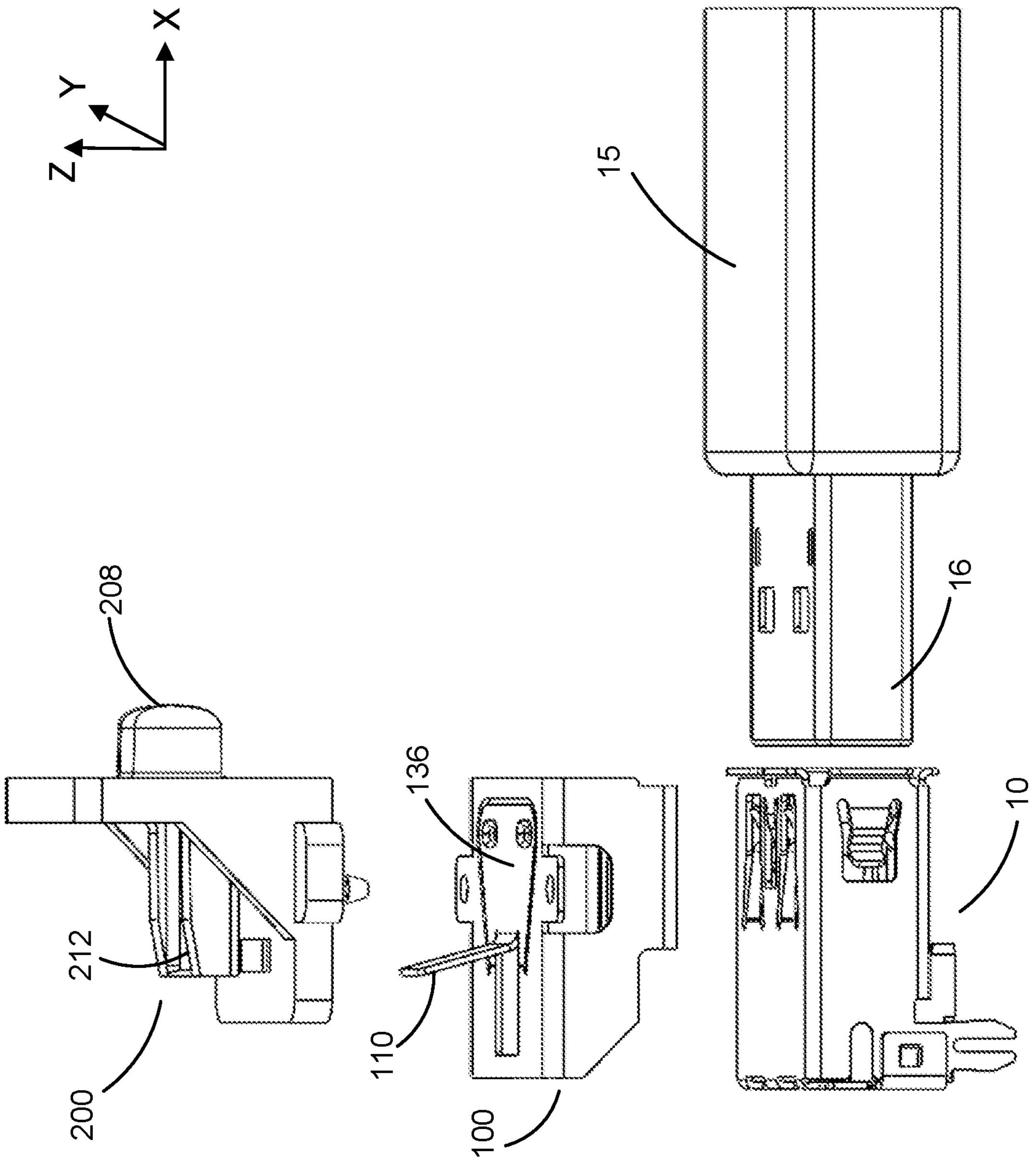
FIG. 6 is an exploded isometric view of a connector retention device attachable to a receptacle configured in accordance with embodiments of the disclosed technology.
Figure 7:
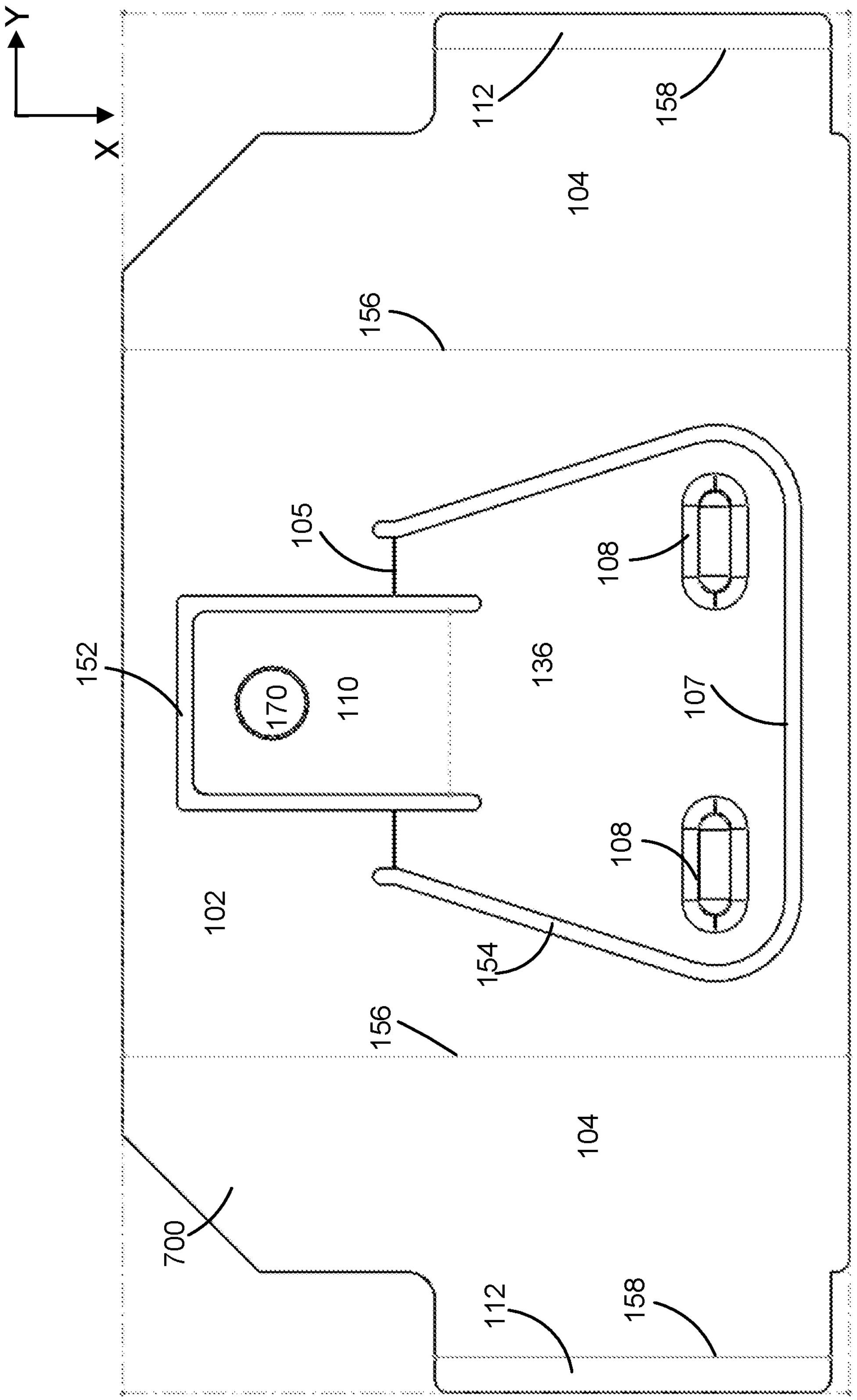
FIG. 7 is a schematic representation of a sheet material illustrating the processes involved in manufacturing the enhanced retention force device in accordance with embodiments of the disclosed technology.
Figure 8:
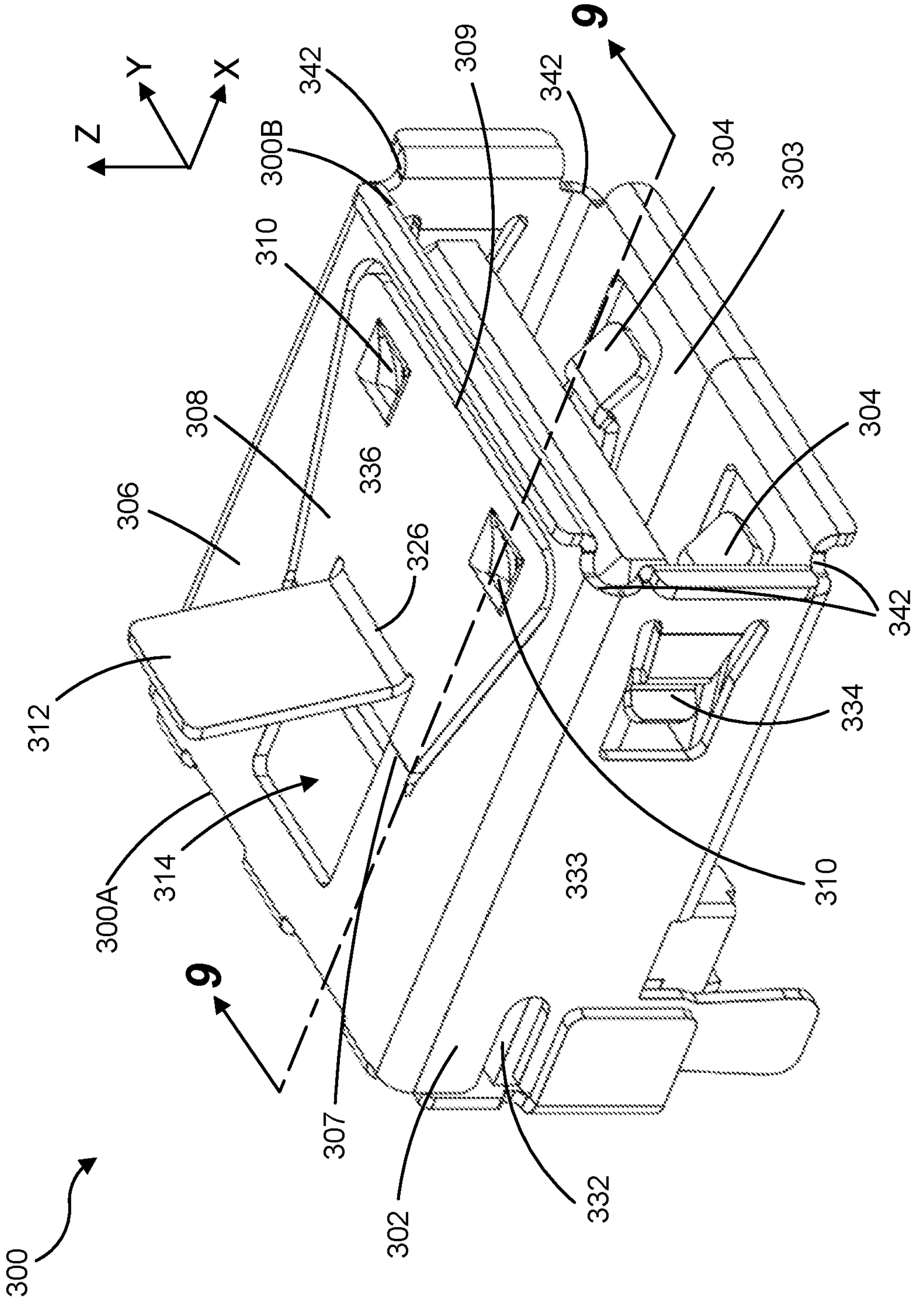
FIG. 8 is an isometric view of a USB receptacle incorporating retention enhancement features configured in accordance with embodiments of the disclosed technology.

For illustrative purposes, a coordinate system is provided in FIGS. 1-11, in which an X-axis extends along a length direction of a USB receptacle (e.g., between a proximal end region 10A and a distal end region 10B of a USB receptacle 10 as illustrated in FIG. 1, or between a proximal end region 300A and a distal end region 300B of a USB receptacle 300 as illustrated in FIG. 8), the Y-axis is orthogonal to the X-axis and extends along a lateral or transverse axis or width direction of the USB receptacle, and a Z-axis extends orthogonal to the X- and Y-axis through the thickness of the USB receptacle. A USB device (e.g., the USB device 15 as illustrated in FIG. 1) may be inserted into or removed from the USB receptacle (e.g., the USB receptacle 10 as illustrated in FIG. 1) along the X-axis direction.

FIG. 1 illustrates a conventional USB type A receptacle 10 and plug connector 16 of a USB device 15. The receptacle 10 may have a proximal end region 10A and a distal end region 10B. The receptacle 10 typically includes an outer shell housing 12 that can be mounted and/or soldered to a printed circuit board (not shown). The outer shell housing 12 also encloses the various electrical connections associated with a USB connector arrangement. The receptacle 10 is configured to receive the mating plug connector 16 and retain it therein with spring fingers or pressure tabs 14 that engage mating apertures 18 formed in the plug connector 16. The pressure tabs 14 comprise leaf spring elements formed (e.g., stamped and embossed) into the housing top panel. These pressure tabs 14 provide a certain amount of retention force to hold the plug connector 16 in the receptacle 10. The resulting retention force is satisfactory for certain applications; however, in some applications it is desirable to increase or enhance the force required to remove the plug connector 16 from the receptacle 10.

Figure 2:
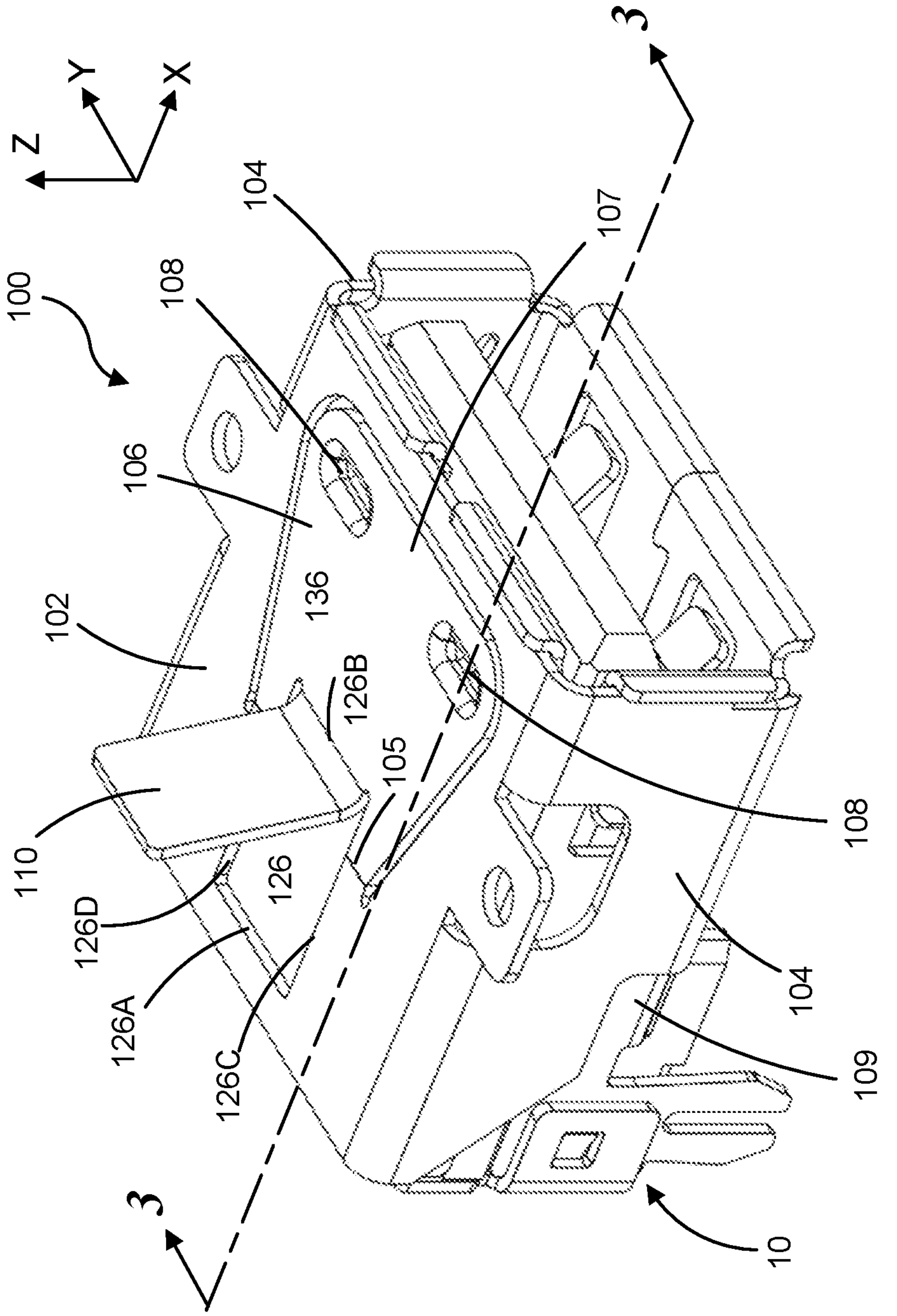
FIG. 2 is an isometric view illustrating an enhanced retention force device assembled to a USB receptacle configured in accordance with embodiments of the disclosed technology.

With reference to FIG. 2, the disclosed technology provides enhanced retention force in the form of a connector retention device (or referred to as a clip, a retention clip, or an enhanced retention force device) 100 that can be clipped onto the existing USB receptacle (or referred to as a USB connector) 10. Accordingly, the connector retention device 100 ("device 100") can be sized and configured to engage a standard USB receptacle 10. In some embodiments, the device 100 can include a frame panel 102 with a pair of opposed sidewall engaging flanges 104 extending orthogonally from the frame panel 102. Each sidewall engaging flange 104 is positioned to closely confront a corresponding side portion 109 of the standard USB receptacle 10 as shown. The device 100 also includes a spring tab 106. The spring tab 106 may include a retention arm 136 and a lever arm 110. The retention arm 136 may include a proximal end portion 105 connected to the frame panel 102 and a distal end portion 107 having a pair of protrusions 108. In some embodiments, at least a portion of the spring tab 106 is co-planar with the frame panel 102 in some circumstances. Each protrusion 108 is positioned to releasably engage a corresponding spring finger 14 (FIG. 1) of the USB receptable 10. In some embodiments, the protrusions 108 comprise embossed features. Without limitation, these features can be round or obround in shape, for example.

In some embodiments, the device 100 can comprise any suitable material such as beryllium copper or spring steel sheet metal, for example. Depending on the material specifications, the thickness of the material can vary. In one embodiment, the material can be approximately 0.012 inches thick. Although, the disclosed technology is shown and described with respect to USB type A connectors, the technology can be applied to other receptacle and connector types, such as HDMI connectors, for example. Furthermore, the disclosed technology can be applied to different version of USB connectors, such as USB 2.0 and 3.0 standards.

In some embodiments, the lever arm 110 may be configured to cause the spring tab 106, or a portion thereof (e.g., the retention arm 136), to deflect at different angles (e.g., with respect to the plane defined by the X- and Y-axes (or referred to as a X-Y plane), or with respect to the frame panel 102) as the lever arm 110 is positioned differently with respect to the X-Y plane, or with respect to the frame panel 102, thereby causing the protrusion(s) 108 to engage or disengage the corresponding spring finger(s) 14. The lever arm 110 may move relative to the frame panel 102 and/or a remaining portion of the spring tab 106 (e.g., the retention arm 136). The lever arm 110 extends laterally (along the Y-axis). The lever arm 110 may be connected to and extend outward (substantially along the Z-axis or at an angle to the X-Y plane) from the retention arm 136 of the spring tab 106. The lever arm 110 may be at a perpendicular or oblique angle to the plane defined by the X-Y plane. The lever arm 110 may be configured to receive an actuating force to be actuated, causing the retention arm 136 of the spring tab 106 to deflect at different angles with respect to the X-Y plane (or with respect to the frame panel 102) as the lever arm 110 is positioned differently.

In some embodiments, the lever arm 110 may be received in an opening 126. The lever arm 110 may be actuated to pivot toward the frame panel 102 to cause the spring tab 106 to deflect at a suitable angle, thereby facilitating releasing the enhanced retention force of the receptacle 10. The opening 126 may have a proximal edge 126A along the X-axis. The lever arm 110 and the retention arm 136 of the spring tab 106 meet at a bend edge 126B where the opening 126 ends. The lever arm 110 transitions to the retention arm 136 via the bend edge 126B (similar to a bend radius 326 as illustrated in FIG. 8). The opening 126 may have lateral edges 126C and 126D that limit lateral movement of the lever arm 110 along the Y-axis within the opening 126. In some embodiments, at least a portion of the opening 126 may be formed by or located at an aperture 126-1 in the frame panel 102. In some embodiments, at least a portion of the opening 126 may be formed by or located at an aperture

126-2 in the spring tab 106. For example, the aperture 126-2 may extend between the proximal end portion 105 and the distal end portion 107 of the spring tab 106, partially through the length of the spring tab 106 along the X-axis. Merely by way of example, the opening 126 may be formed solely by or located solely in the aperture 126-1 in the frame panel 102 such that the proximal edge 126A, bend edge 126B, and lateral edges 126C and 126D are all situated in the frame panel 102. As another example illustrated in FIG. 3, the opening 126 may be formed collectively by the aperture 126-1 in the frame panel 102 and the aperture 126-2 in the spring tab 106 such that the proximal edge 126A is located in the frame panel 102, the bend edge 126B is located between the proximal end portion 105 and the distal end portion 107 in the retention arm 136 of the spring tab 106, and lateral edges 126C and 126D each span the frame panel 102 and the spring tab 106. In this example, the lateral edges 126C and 126D may be substantially continuous across apertures 126-1 in the frame panel 102 and 126-2 in the spring tab 106, such that the opening 126 may be substantially continuously.

Figure 3:
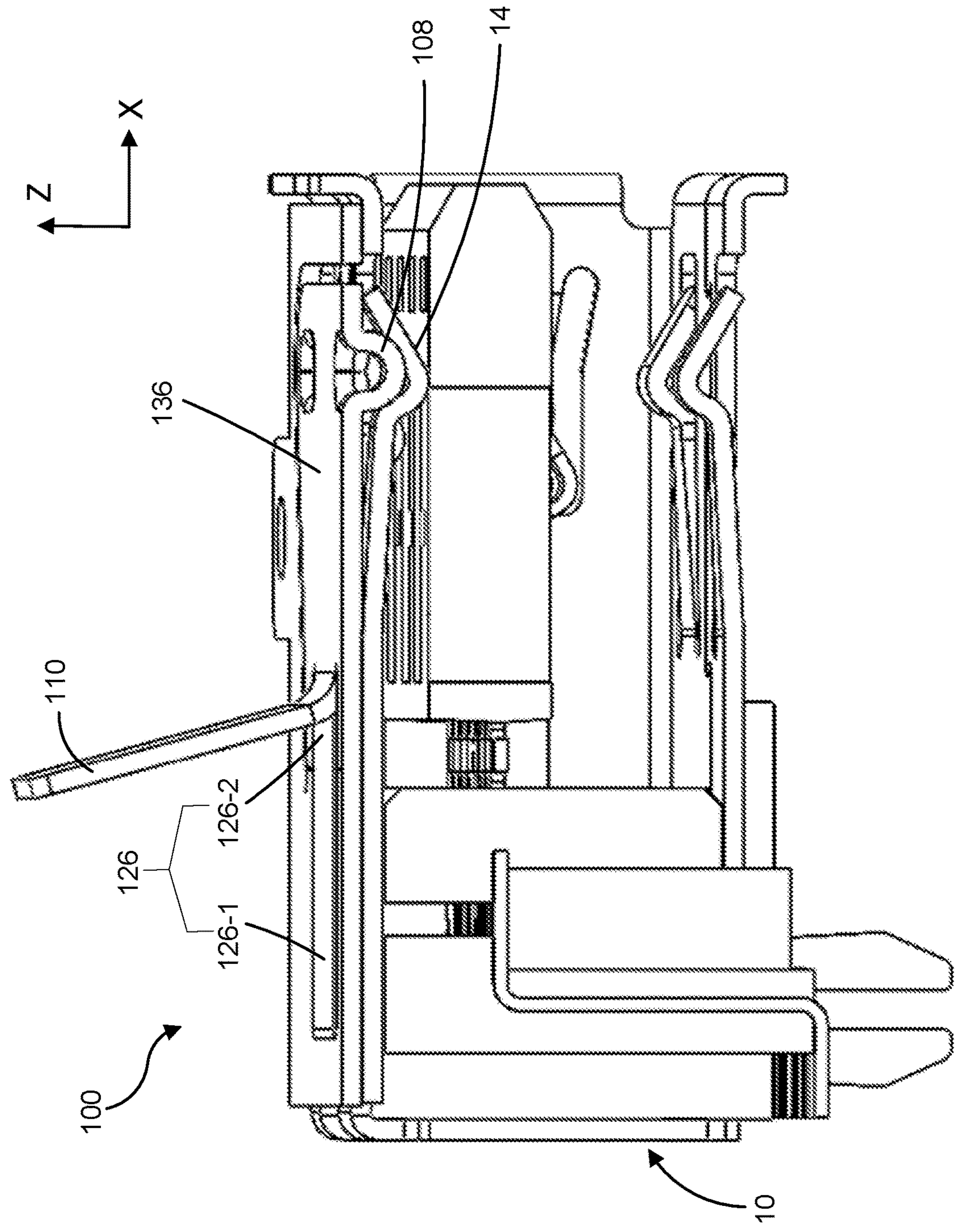
FIG. 3 is a side cross-sectional view taken along line 3-3 in FIG. 2.

The lever arm 110 may be moved or pivoted between an unactuated position where an enhanced retention force to retain a USB device (e.g., the USB device 15) in the receptacle 10 is present and an actuated position where such an enhanced retention force is released. At the unactuated position, the lever arm 110 is positioned substantially upward away from the X-Y plane (or from the frame panel 102) as illustrated in FIGS. 2 and 3. At the actuated position, the lever arm 110 is pivoted downward toward the frame panel 102. The lever arm 110 may remain at the unactuated position until its actuation by a force (or referred to as an actuating force) applied thereto. The lever arm 110 at its actuated position may restore to its unactuated position after the actuating force is removed.

When the lever arm 110 is at its unactuated position, the retention arm 136 of the spring tab 106 may be substantially parallel to or coplanar with the frame panel 102 (or the X-Y plane), such that the protrusions(s) 108 engage(s) the corresponding spring finger(s) 14 and an enhanced retention force is generated in the receptacle 10 to hold the USB device 15. When the lever arm 110 is pushed to deflect downward toward the frame panel 102, the retention arm 136 of the spring tab 106 is pivoted upward out of the X-Y plane or to become non-coplanar with the frame panel 102, thereby moving the protrusions 108 away from the spring fingers 14 and releasing the enhanced retention force of the receptacle 10. In other embodiments, the lever arm 110 is omitted. For example, the spring tab 106 may include or be connected to a portion that is similar to the lever arm 110, configured to facilitate the application of force on the spring tab 106. This, in turn, may cause the spring tab 106 to deflect, adjusting the retention force of the receptacle 10. Additionally or alternatively, the enhanced retention force can be configured by selecting material thickness and/or the width of the hinge portion(s) of the proximal end portion 105, for example.

FIG. 3 is a side cross-sectional view detailing how the protrusions 108 engage the spring fingers 14 of the receptacle 10. When the spring fingers 14 are engaged with the protrusions 108, the retention arm 136 of the spring tab 106 of the connector retention device 100 resists upward movement of the spring fingers 14 to enhance the retention force of the receptacle 10.

Figure 4B:
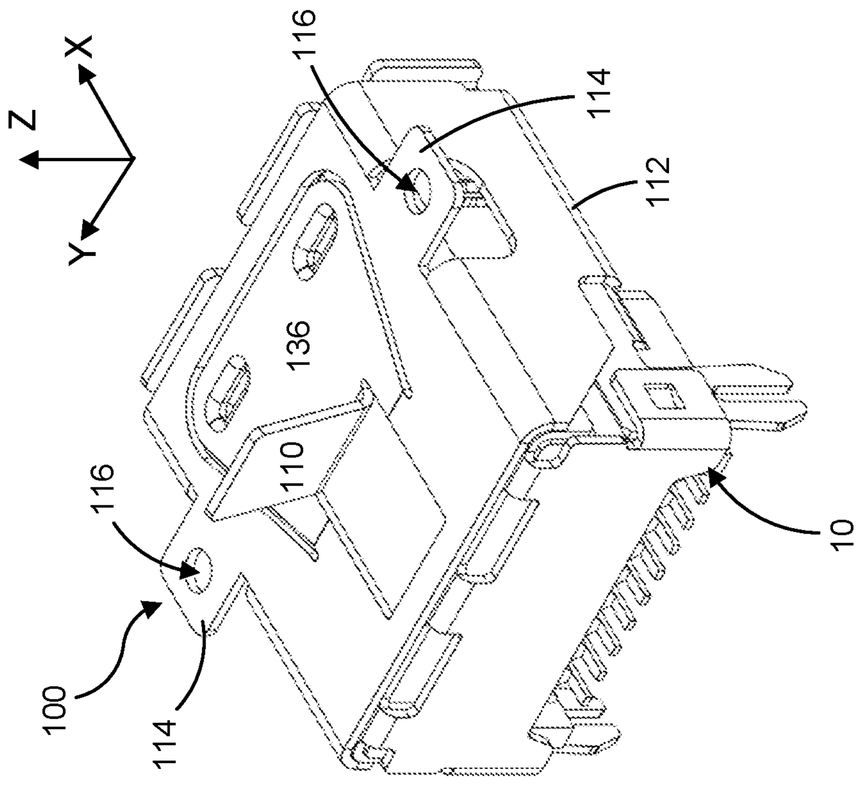
FIG. 4B is an isometric view of the enhanced retention force device of FIGS. 2-4A as viewed from above and behind.
Figure 4A:
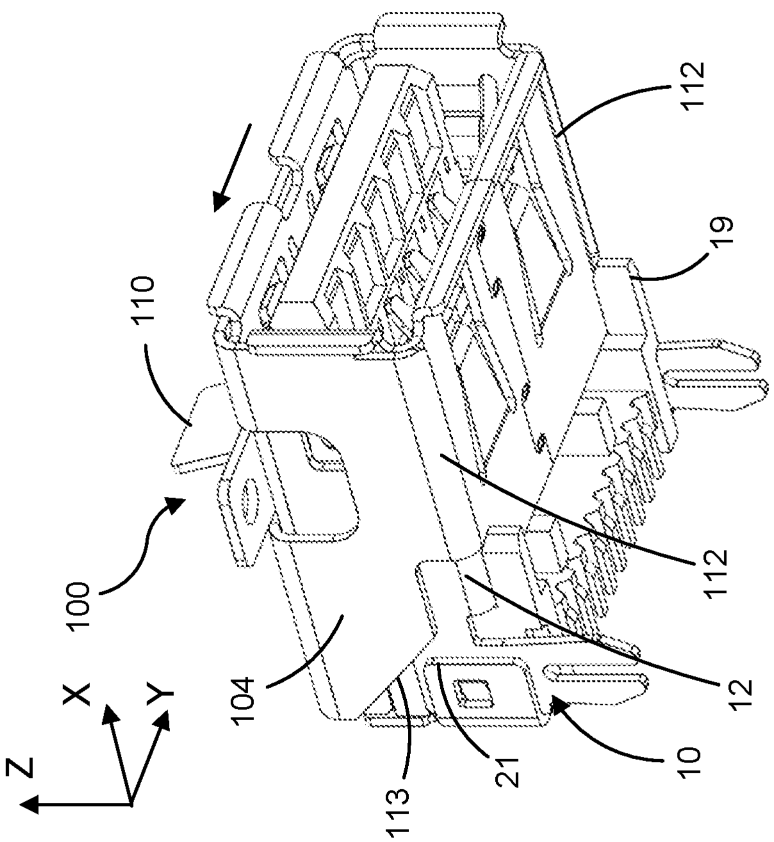
FIG. 4A is an isometric view of the enhanced retention force device of FIGS. 2 and 3 as viewed from below and in front.

As shown in FIGS. 4A and 4B, each sidewall engaging flange 104 can include an arcuate hook portion 112 positioned to hook onto a radiused portion of the outer shell housing 12. As the device 100 is pushed onto the receptacle 10 from above, the sidewall engaging flanges 104 resiliently deflect slightly and snap into position around the receptacle 10 when the arcuate hook portions 112 clear the bottom of the outer shell housing 12.

In order to help prevent the device 100 from shifting backwards when the lever arm 110 is actuated, the device includes features, such as hook portions 112, that can abut corresponding features of the receptacle 10. For example, hook portions 112 can abut tabs 19 of the receptacle 10. In addition, the sidewall engaging flanges 104 can include features, such as chamfers 113, that abut other features of the receptacle 10, e.g., bracket portion 21. Accordingly, these features (e.g., hook portions 112 and chamfers 113) capture the device 100 on the receptacle 10. These attachment features can be configured for individual designs, based on the existing connector assembly's physical feature geometry, as there can be some variation across manufacturers and USB versions. In some embodiments, a connector retention device can include additional/other features, apertures, and cut-outs to engage or abut features of a particular receptacle design.

With reference to FIG. 4B, the device 100 can include a pair of mounting tabs 114 having apertures 116 formed therethrough. The mounting tabs 114 are positioned to receive a button component 200 as shown in FIGS. 5A and 5B.

Figure 10:
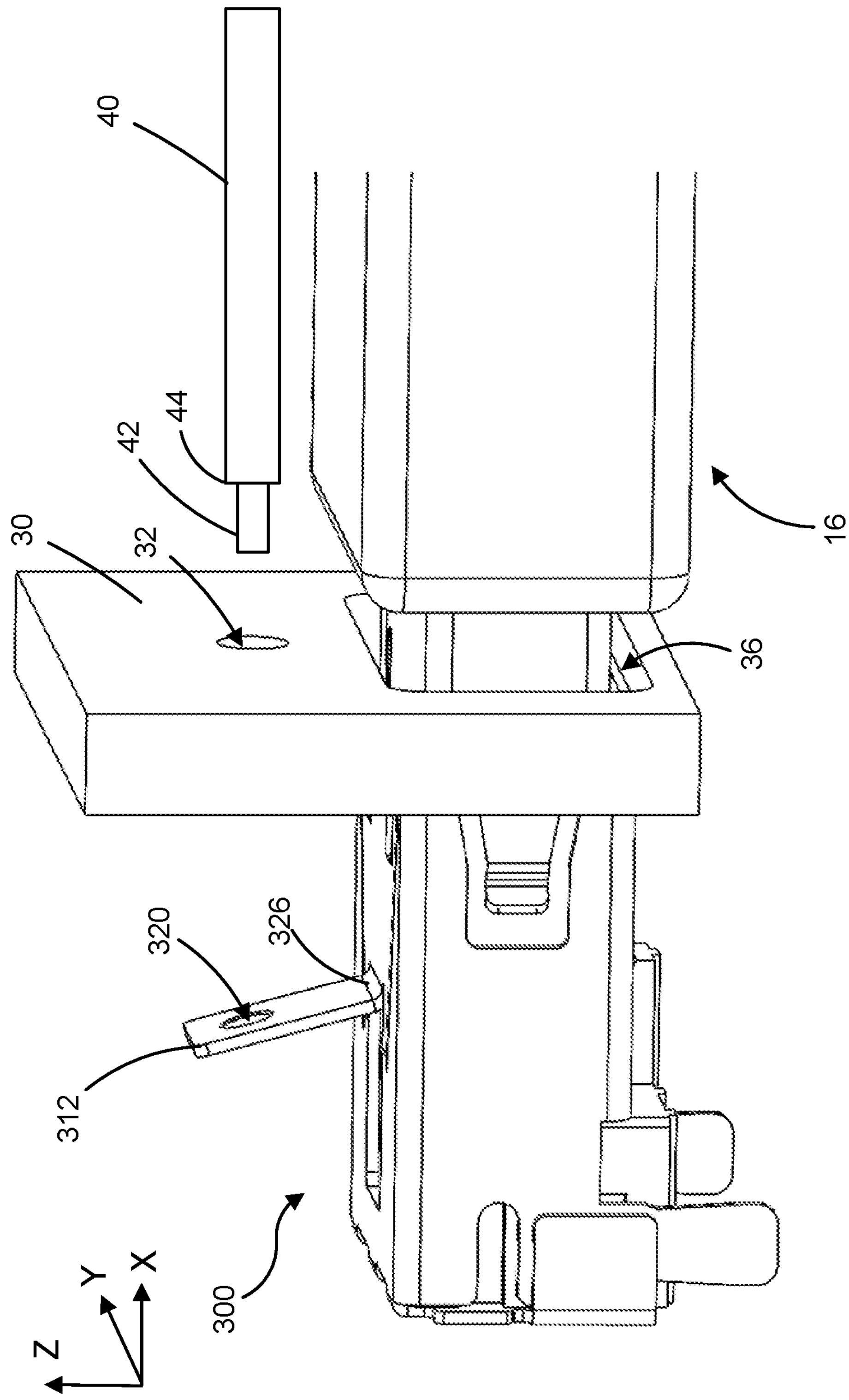
FIG. 10 is an isometric view illustrating a receptacle positioned behind an enclosure panel of a device configured in accordance with embodiments of the disclosed technology.

In some embodiments, at least a portion of the receptacle 10 with the connector retention device 100 clipped thereon may be positioned within an enclosure (e.g., the case of a computer tower, the case of a portable device such as a single- or multi-port adapter, a television, a set-top box, a charging device (e.g., a USB charger), or a docking station; not shown). The receptacle 10 may have an opening to receive the plug connector 16 of a USB device (e.g., the USB device 15). The opening may extend from the distal end region 10B along the X-axis partially through the length of the receptacle 10. The distal end region 10B may be substantially flush with the enclosure's outer wall (or referred to as a panel, e.g., a panel 30 as illustrated in FIG. 10), or substantially congruent with an opening (e.g., 36 in FIG. 10) in the enclosure's outer wall. This arrangement may allow the receptacle 10's opening to be exposed to the exterior of the enclosure, enabling the receptacle 10 to receive a USB device (e.g., the USB device 15). The lever arm 110 may remain at the unactuated position where an enhanced retention force is present to better retain the USB device in the receptacle 10 until the lever arm 110 is actuated to release the enhanced retention force to facilitate removal of the USB device from the receptable 10. The lever arm 110 may be actuated by a force (or referred to as an actuating force) applied thereto, e.g., via the first section of the lever arm 110. Merely by way of example, the first section of the lever arm 110 may be exposed to the exterior of the enclosure to be accessible for a user to apply force. As another example, the first section of the lever arm 110 may be situated within the enclosure and accessible via another component, e.g., a button component 200 as illustrated in FIGS. 5A and 5B, a tool 40 as illustrated in FIG. 10. When the actuating force is removed, the lever arm 110 may return to its unactuated position.

Figure 5B:
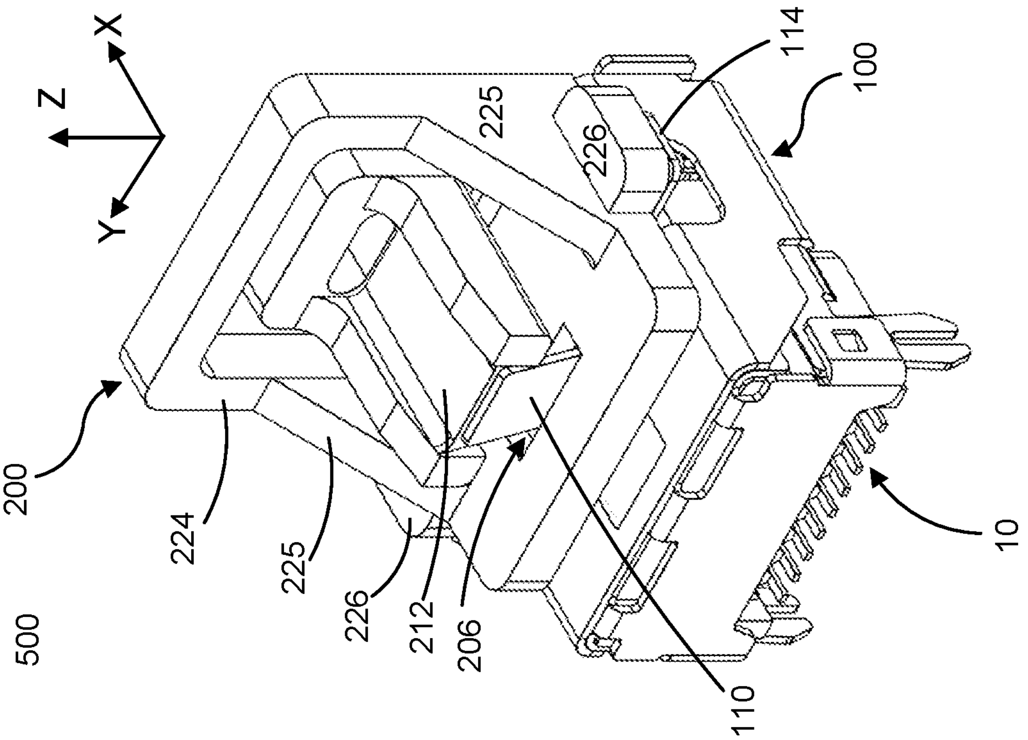
FIG. 5B is an isometric view of the button component of FIG. 5A as viewed from above and behind.
Figure 5A:
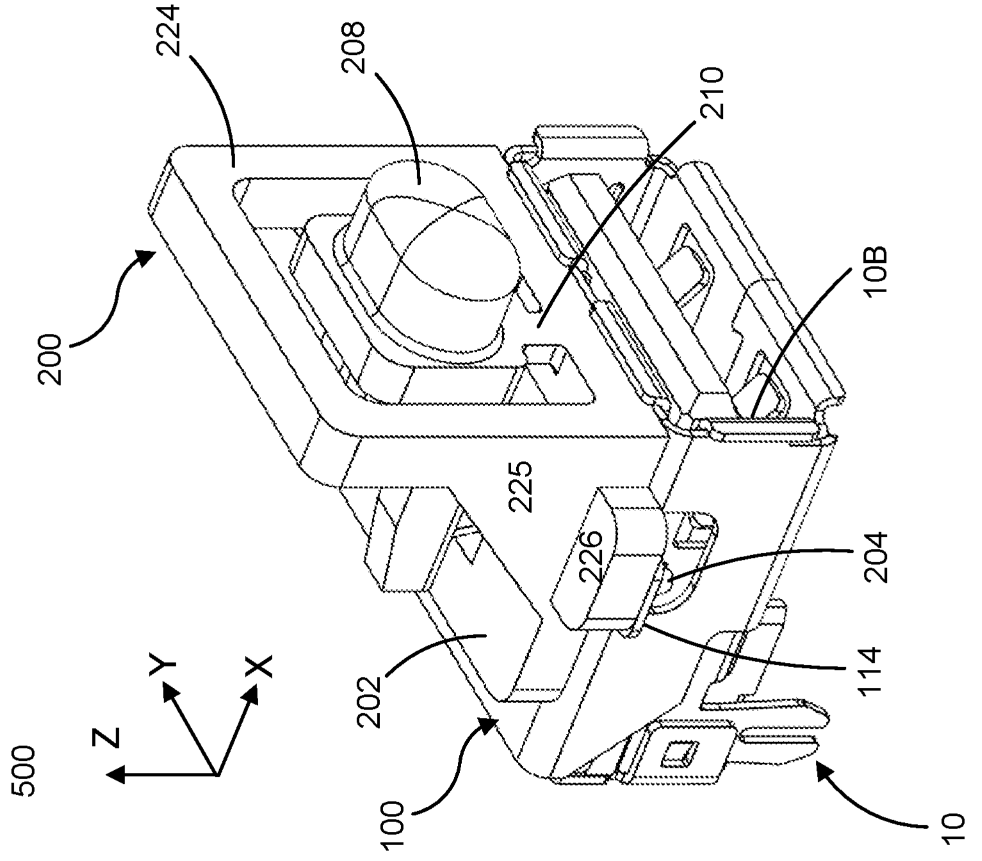
FIG. 5A is an isometric view illustrating a button component assembled to the enhanced retention force device of FIGS. 2-4B configured in accordance with embodiments of the disclosed technology.

Turning to FIGS. 5A and 5B illustrating an assembly 500 in which a button component assembled to the connector retention device 100, the button component 200 can be attached to the mounting tabs 114 and positioned to actuate the lever arm 110 thereby moving the protrusions 108 away from the spring fingers 14 (see FIG. 3). The button component 200 can include a frame 224 and a base 202. The frame 224 may be substantially perpendicular to the base 202 and connected to the base 202 via a support section 225 on each of two sides of the frame 224. The two support sections 225 may be spaced from each other along the Y-axis direction (or referred to as the width direction of the connector retention device 100 or the receptacle 10). A support section 225 may include an extension 226 that extends outward along the Y-axis from the support section 225. The extensions 226 may each include a barbed feature 204 that extends through an aperture 116 of one of the mounting tabs 114 such that the base 202 is coupled to the connector retention device 100. In some embodiments, the frame 224 may include only one support section 225; the support section 225 may include an extension 226; the extension 226 may include a barbed feature 204 that extends through an aperture 116 of a mounting tab 114 to couple the base 202 to the connector retention device 100. The base 202 includes an arm aperture 206, through which the lever arm 110 extends to meet an extension member 212. The extension member 212 extends from a button 208 that is supported on the frame 224 and carried by the base 202 via a resilient hinge 210. The button component 200 can be comprised of a resilient material such as plastic. The base 202 coupled to the connector retention device 100 may be positioned within the enclosure. The frame 224 may be positioned substantially flush with the enclosure's outer wall (e.g., a panel 30 as illustrated in FIG. 10), or substantially congruent with an opening (e.g., 36 in FIG. 10) in the enclosure's outer wall, exposing the button 208 to the exterior of the enclosure and allowing it to be accessible for a user to apply force and actuate the lever arm 110 by pressing the button 208. Accordingly, the button 208 and extension member 212 can be manually deflected such that the extension member 212 pushes against the lever arm 110 thereby releasing the enhanced retention force of the spring tab 106 (FIG. 3) to facilitate removal of the USB device from the receptacle 10.

At least a portion of the retention clip 100 or at least a portion of the button component 200 may include a resilient material. At least a portion of the retention clip 100 or at least a portion of the button component 200 may include plastic, aluminum or an alloy thereof, stainless steel, titanium or an alloy thereof, carbon fiber reinforced polymers (CFRP), high-impact polystyrene (HIPS), polycarbonate (PC), polyamide, or fiberglass reinforced plastics (FRP). For example, the frame panel 102, the spring tab 106, the lever arm 110, or a portion thereof, may include plastic, an aluminum alloy, stainless steel, copper, a copper alloy, etc.

FIG. 6 is an exploded isometric view of a connector retention device attachable to a receptacle configured in accordance with embodiments of the disclosed technology. As illustrated, the connector retention device 100 may be attached to the receptacle 10 by, e.g., clipping. The receptacle 10 may be configured to receive a connectable device, e.g., the USB device 15, via the plug connector 16. Merely by way of example, the receptacle 10 may be a standard USB receptacle of any version among USB 2.0 to 3.1, and the plug connector 16 may be a standard USB cable of a corresponding version (e.g., any version among 2.0 to 3.1), including those that support SuperSpeed (SS)). The connector retention device 100 may be configured to generate, via the spring tab 106, an enhanced retention force in the receptacle 10 to hold the device 15. When an actuating force is applied to the lever arm 110 via the button 208 and the extension member 212 of the button component 200, the lever arm 110 of the spring tab 106 may be actuated to release the enhanced retention force, thereby facilitating disconnection of the plug connector 16 of the device 15 from the receptacle 10.

FIG. 7 is a schematic representation of a sheet material illustrating the processes involved in manufacturing the enhanced retention force device in accordance with embodiments of the disclosed technology. The connector retention device 100 may be manufactured using a single piece of material for at least simplicity and unit cost reasons. The material may include a resilient material. Examples of suitable materials include stainless steel, copper, or an alloy thereof, a molded Carbon fiber, etc.

A sheet 700 of the desired shape may be cut from a large piece of material by, e.g., stamping, cutting, etc. The lever arm 110 may be generated by, e.g., stamping, cutting, etc. the sheet 700 along a line 152 and folded or bent upward out of the plane of the sheet 700 (e.g., the X-Y plane). The folding or bending of the lever arm 110 out of the plane of the sheet 700 may form the opening 126. The retention arm 136 may be generated by stamping or cutting the sheet 700 along a line 154. The protrusions 108 may be generated by, e.g., stamping, pressing, embossing, etc. A feature 170 may be generated on the sheet 700 by, e.g., stamping, cutting, etc. The feature 170 may be an engagement feature configured to facilitate the application of an actuating force as described elsewhere in the present document. The sheet 700 may be bent or folded along lines 156 to form the opposed sidewall engaging flanges 104 and the frame panel 102 therebetween. The sheet 700 may be bent or folded along lines 158 to form a hook portion 112 at an edge portion of a sidewall engaging flange 104.

The generation of the sheet 700, the lever arm 110, the retention arm 136, the engagement feature 170, the protrusions 108, by stamping, cutting, pressing, embossing, etc., and the formation of the sidewall engaging flanges 104, the frame panel 102, the hook portions 112 (by, e.g., folding or bending operations) may be arranged in a suitable order to facilitate the manufacturing process of one or multiple pieces of the connector retention device 100. Merely by way of example, the stamping/cutting operations may be performed before the folding/bending operations. As another example, the generation of at least two of the sheet 700, the lever arm 110, the retention arm 136, and the engagement feature 170 may be perform substantially simultaneously. As a further example, the generation of at least two of the sheet 700, the lever arm 110, the retention arm 136, and the engagement feature 170 may be perform sequentially. As a still further example, to form the lever arm 110, the stamping/cutting may be performed as a separate step than the bending, with the bending of the cut lever arm 110 being performed after the stamping/cutting step to form the retention arm 136 and the feature 170 and the stamping/pressing/embossing step to form the protrusions 108 are completed.

The cutting applicable in various operations during the manufacturing process may include, e.g., laser cutting, plasma cutting, waterjet cutting, or the like, or a combination thereof. The folding or bending operation applicable in various operations during the manufacturing process may be achieved by, e.g., sheet metal brake (or referred to as a bending brake), a press brake (e.g., a computer numerally controller (CNC) press brake), or the like, or a combination thereof.

FIG. 8 illustrates a USB receptacle 300 incorporating retention enhancement features configured in accordance with embodiments of the disclosed technology. The receptacle 300 is configured as a standard USB receptacle except that the top panel 306 includes retention enhancement features similar to those described above with respect to the connector retention device 100. The receptacle 300 may have a proximal end region 300A and a distal end region 300B. The receptacle 300 may have an opening to receive the plug connector 16 of a USB device (e.g., the USB device 15). The opening may extend from the distal end region 300B inward along the X-axis partially through the length of the receptacle 300.

The receptacle 300 includes an outer shell housing 302 which includes spring fingers 304 located on a bottom panel 303. However, as mentioned above, the top panel 306 includes a spring tab 308. The spring tab 308 may include a retention arm 336 and a lever arm 312. The retention arm 336 may include a proximal end portion 307 (e.g., hinge portion(s)) connected to the top panel 306 and a distal end portion 309 having a pair of protrusions 310. In some embodiments, each protrusion 310 is positioned to directly engage a corresponding aperture 18 of the USB plug connector 16 (FIG. 1) thereby creating an enhance retention force to retain the device 15 in the receptacle 300 via the plug connector 16.

The lever arm 312 may be configured to facilitate disengaging the protrusions 310 from the apertures 18. In some embodiments, the lever arm 312 may be actuated by an actuating force to deflect about the proximal end portion 307 with respect to the top panel 306. The deflection of the lever arm 312 may cause the retention arm 336 of the spring tab 308 to deflect or pivot (e.g., pivoting upward away from the top panel 306) such that the protrusions 310 are disengaged from the apertures 18, thereby releasing the enhance retention force and allowing the device 15 to be removed from the receptacle 300.

The lever arm 312 can be formed by stamping or cutting the top panel 306 which results in an opening 314. The lever arm 312 may be connected to the retention arm 336 via a bend radius 326. The lever arm 312 may extend outward (substantially along the Z-axis or at an angle to the X-Y plane) from the retention arm 336 of the spring tab 308. The lever arm 312 may be moveably connected to the top panel 306. The lever arm 312 may be deflectable about the proximal end portion 307 with respect to the top panel 306.

The outer shell housing 302 may have opposing side panels 333 extending between the top panel 306 and the bottom panel 303. The opposing side panels 333 may be substantially perpendicular to the top panel 306 and/or the bottom panel 303. On each of one or both of the side panels 333 may include an attachment feature 334 (e.g., spring fingers) to facilitate the attachment of the receptacle 300 to a surrounding component, e.g., a component directly or ultimately attached to an enclosure (e.g., a panel 30 as illustrated in FIG. 10) where the receptacle 300 is attached. In some embodiments, the opening 314 and other openings resulting from forming the features of the outer shell housing 302 can be covered with suitable shielding material, such as copper tape (not shown). In some embodiments, the outer shell housing 302 can include mounting tabs (not shown) such as tabs 114 shown in FIG. 4B to mount a corresponding button component, such as button component 200 (FIGS. 5A and 5B).

Figure 9:
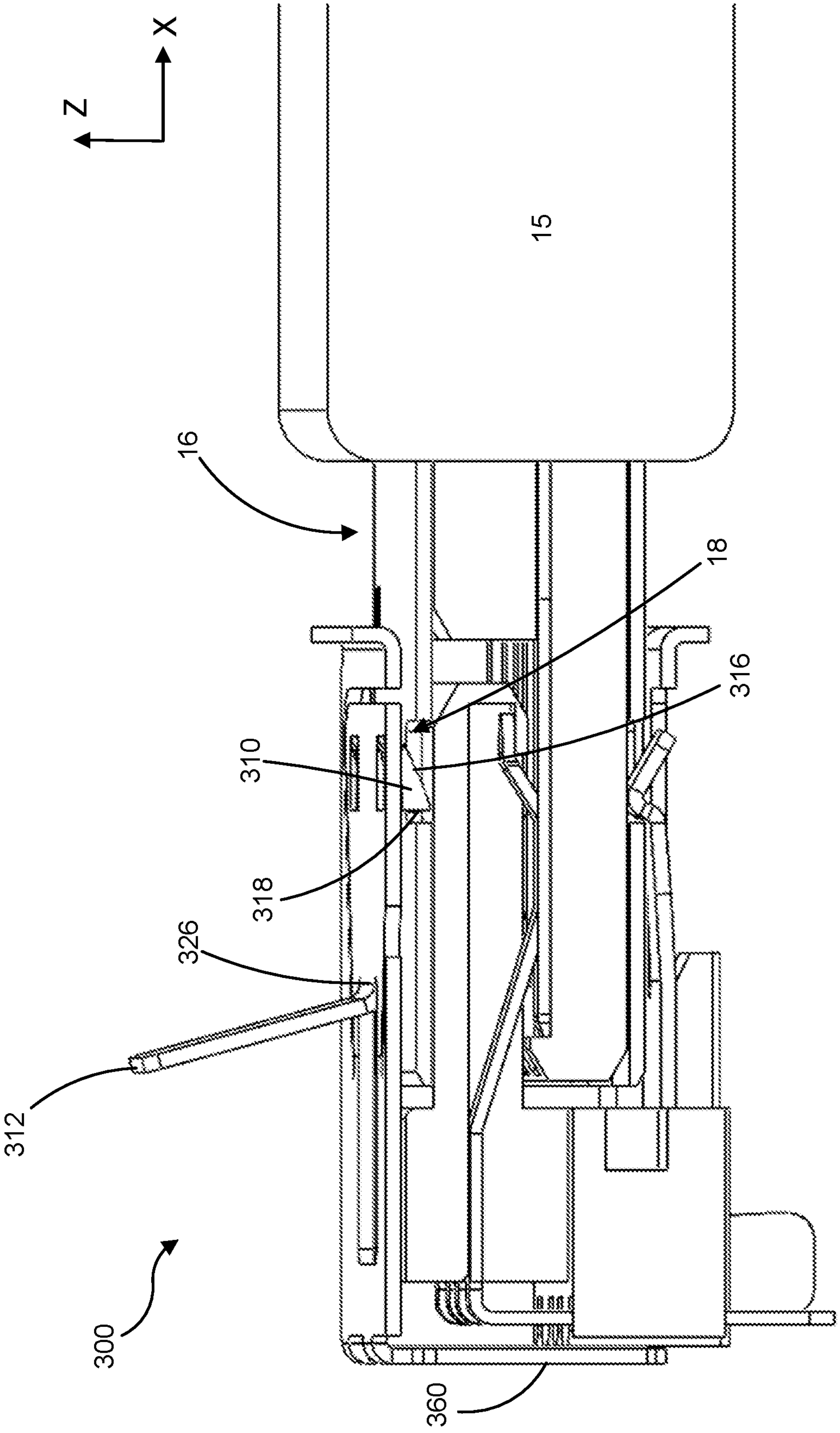
FIG. 9 is a side cross-sectional view taken along line 9-9 in FIG. 8.

FIG. 9 is a side cross-sectional view detailing how the protrusions 310 engage the apertures 18 of plug connector 16. In some embodiments, the protrusions 310 comprise a lance formed in the spring tab 308. As known in the art, a lance is formed with a tool that both cuts (lances) and forms sheet metal. The protrusions 310 can be in the form of a short louver. Merely by way of example, protrusion 310 is a short closed-end straight back louver. In some embodiments, the protrusions 310 each include a ramped portion 316 and an edge 318. The edge 318 engages the aperture 18, thereby locking the plug connector 16 in the receptacle 300. The edge 318 is parallel with the edge of aperture 18. Thus, the plug connector 16 may be very difficult to remove unless the protrusions 310 are disengaged from the apertures 18 by actuating the lever arm 312.

In some embodiments, as shown in FIG. 10, the receptacle 300 is positioned behind an enclosure panel 30 of a device (e.g., a computer tower, a portable device such as a single- or multi-port adapter, a television, a set-top box, a charging device (e.g., a USB charger), or a docking station). Thus, the disclosed receptacle 300 can inhibit access to the lever arm 312 and prevent the plug connector 16 from being removed. In some embodiments, the panel 30 can have an access aperture 32 through which a tool 40 can be inserted to actuate the lever arm 312 to release the protrusions 310 from the apertures 18. The lever arm 312 may be deflectable about the proximal end portion 307. The lever arm 312 may be actuated by a force (or referred to as an actuating force) to deflect about the proximal end portion 307 with respect to the top panel 306. The deflection of the lever arm 312 may cause the retention arm 336 of the spring tab 308 to deflect or pivot (e.g., pivoting upward away from the top panel 306). When the actuating force is removed, the lever arm 312 may return to its unactuated position such that the spring tab 308 may be positioned with the protrusions 310 engaging the apertures 18 of the plug connector 16, thereby locking the plug connector 16 in the receptacle 300.

The lever arm 312 may include an engagement feature to facilitate the application of the actuating force to the lever arm 312. In some embodiments, the engagement feature may include an aperture 320 as illustrated in FIG. 10. The tool 40 may include a pin 42 extending beyond a shoulder 44 of the tool 40. In some embodiments, the aperture 320 may receive the pin 42 extending from the tool 40. The shoulder 44 between the pin 42 and the tool 40 pushes against the lever arm 312 when the pin 42 is inserted into the aperture 320. Thus, the pin 42 helps prevent the tool 40 from sliding off of the angled surface of the lever arm 312. The aperture 320 may be a through-hole. In some embodiments, the engagement feature may include an indented or embossed region that acts as a pocket to receive a tip portion of the tool 40 and help prevent it from sliding off of the lever arm 312. The panel 30 may further include a second aperture 36 through which the plug connector 16 may be inserted in the receptacle 300. The second aperture 36 may be spaced apart from the aperture 32 as illustrated. In some embodiments, the second aperture 36 and the aperture 32 may be one continuous aperture.

Although shown and described here with respect to receptacle 300, the panel arrangement and aperture 320 can be used with the other embodiments disclosed herein. For example, connector retention device 100 can be positioned behind a panel of a device and can include an aperture, similar to that shown in FIG. 10, formed through lever arm 110 (FIG. 2).

At least a portion of the receptacle 300 may include a resilient material. At least a portion of the receptacle 300 may include plastic, aluminum or an alloy thereof, stainless steel, titanium or an alloy thereof, carbon fiber reinforced polymers (CFRP), high-impact polystyrene (HIPS), polycarbonate (PC), polyamide, or fiberglass reinforced plastics (FRP). For example, the outer shell housing 302, the retention arm of the spring tab 308, the lever arm 312 of the spring tab 308, or a portion thereof, may include plastic, an aluminum alloy, stainless steel, etc.

Figure 11:
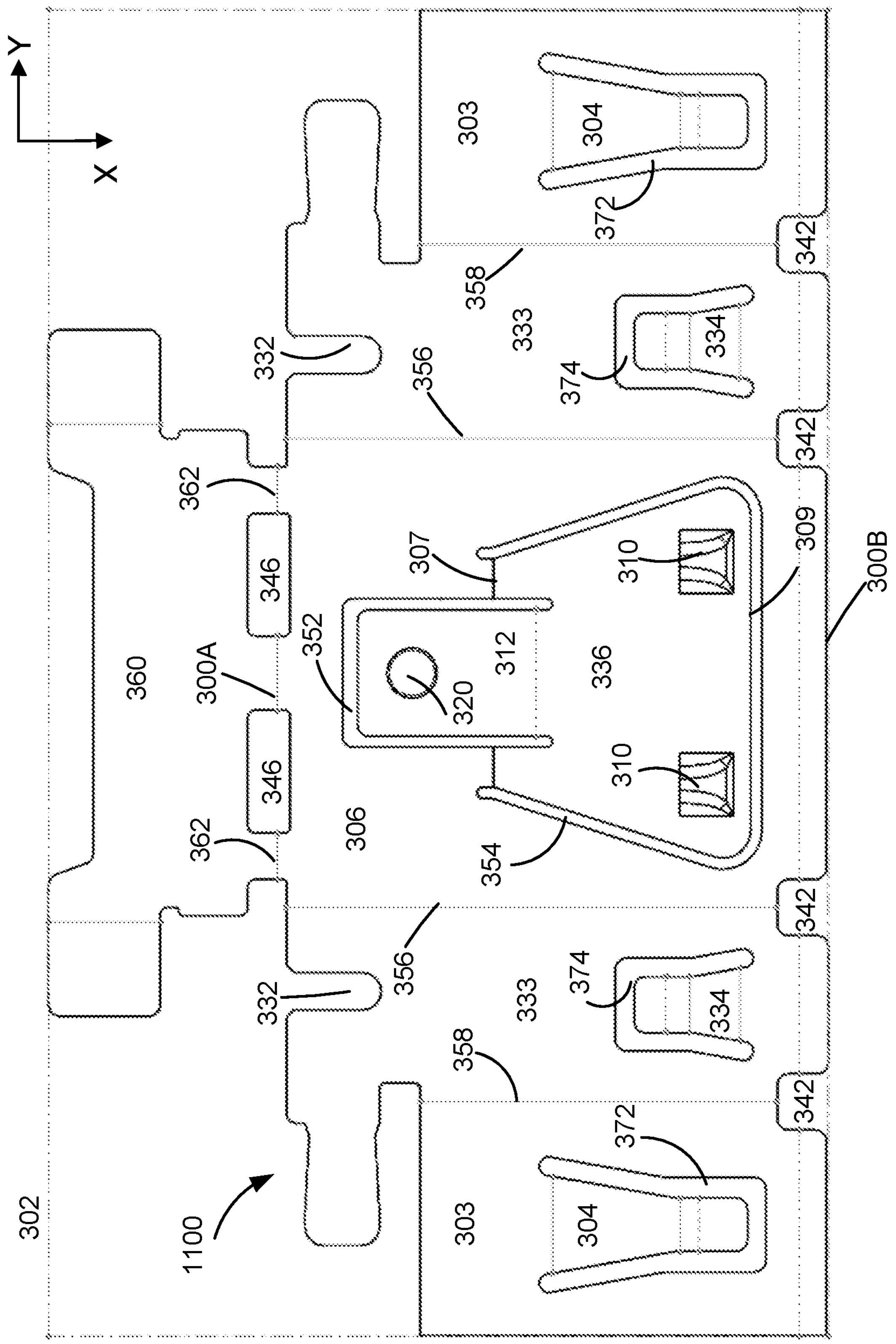
FIG. 11 is a schematic representation of a sheet material illustrating the processes involved in manufacturing an outer shell housing of a receptacle with retention enhancement features in accordance with embodiments of the disclosed technology.

FIG. 11 is a schematic representation of a sheet material illustrating the processes involved in manufacturing an outer shell housing of a receptacle with retention enhancement features in accordance with embodiments of the disclosed technology. The outer shell housing 302 of the receptacle 300, including various retention enhancement features and/or attachment features, may be manufactured using a single piece of material for at least simplicity and unit cost reasons. The material may include a resilient material. Examples of suitable materials include stainless steel, copper, or an alloy thereof, a molded Carbon fiber, etc.

The sheet 1100 of the desired shape may be cut from a large piece of material by, e.g., stamping, cutting, etc. The sheet 1100 may include various cut-outs including, e.g., cut-outs 332, 342, 346, to facilitate the folding/bending of the sheet 1100 to form the three-dimensional receptacle 300. One or more of these cut-outs may be formed in a same operation for geniting the sheet 1100, or in one or more subsequent operations. One or more of these cut-outs may be formed by, e.g., stamping, cutting, etc.

The lever arm 312 may be generated by stamping or cutting the sheet 1100 along a line 352 and folded or bent upward out of the plane of the sheet 1100 (e.g., the X-Y plane). The folding or bending of the lever arm 312 out of the plane of the sheet 1100 may form the opening 314. The retention arm 336 may be generated by stamping or cutting the sheet 1100 along a line 354. The protrusions 310 may be generated by, e.g., stamping, pressing, embossing, etc. The spring fingers 304 may be formed by stamping, cutting, etc., along lines 372. The attachment features 334 may be formed by stamping, cutting, etc., along lines 374. The spring fingers 304 and/or the attachment features 334 may each have a three-dimensional shape formed by folding or bending the portion(s) of the sheet 1100 partially separated from the sheet 1100 by the stamping/cutting operation(s).

The sheet 1100 may be bent or folded along lines 356 to form the opposing side panels 333 and the top panel 306 therebetween. The sheet 1100 may be bent or folded along lines 358 to form the bottom panel 303. The sheet 1100 may be bent or folded along lines 362 to form the back panel 360 that opposes the distal end region 300B of the receptacle 300 where the opening for receiving the plug connector 16 is located.

The generation of the sheet 1100, the lever arm 312, the retention arm 336, the spring fingers 304, the attachment features 334, the protrusions 310, etc. (by, e.g., stamping, cutting, etc.), and the forming of the side panels 333, the top panel 306, the back panel 360, etc. (by, e.g., folding or bending operations) may be arranged in a suitable order to facilitate the manufacturing process of one or multiple pieces of the connector receptacle 300. Merely by way of example, the stamping/cutting operations may be performed before the folding/bending operations. As another example, the generation of at least two of the sheet 1100, the lever arm 312, the retention arm 336, the spring fingers 304, the attachment features 334, the protrusions 310, etc., may be perform substantially simultaneously. As a further example, the generation of at least two of the sheet 1100, the lever arm 312, the retention arm 336, the spring fingers 304, the attachment features 334, the protrusions 310, etc., may be perform sequentially. As a still further example, to form the lever arm 312, the stamping/cutting may be performed as a separate step than the bending, with the bending of the cut lever arm 312 being performed after the stamping/cutting step to form the retention arm 336, the spring fingers 304, and the attachment features 334, and the stamping/pressing/embossing step to form the protrusions 310 are completed.

The cutting applicable in various operations during the manufacturing process may include, e.g., laser cutting, plasma cutting, waterjet cutting, or the like, or a combination thereof. The folding or bending operation applicable in various operations during the manufacturing process may be achieved by, e.g., sheet metal brake (or referred to as a bending brake), a press brake (e.g., a computer numerally controller (CNC) press brake), or the like, or a combination thereof.

Additionally or alternatively, the lever arm 110 or 312 may be configured as a separate piece than the retention arm 136 or 336. Merely by way of example, such a lever arm 110 or 312 may be made of stainless steel using robotic welding. As another example, such a lever arm 110 or 312 may be coupled to the retention arm 136 or 336 via a rivet attachment.

A connector retention device or retention features added to a receptacle as described in various embodiments herein may strengthen the retention force already present in an existing receptacle (e.g., a standard USB type A receptacle to a standard USB device, without altering the original connection or adding extra contact points, thereby offering several benefits in the context of a USB-receptacle pair, and also across a range of applications between a receptacle and a connectable device beyond a USB-receptacle pair. As used herein, a connectable device may refer to a device that can be connected to a receptacle via, e.g., a plug connector. This technology may allow the connector retention device to be used as an add-on, enhancing compatibility with existing connectable devices and infrastructure without modifications to the connectable devices or the receptacles themselves. Technical benefits include at least the following. By strengthening the existing retention force, the connector retention device may ensure more stable and reliable connections between a receptacle and a connectable device (e.g., via a plug connector of the connectable device), reducing the risk of disconnections due to movement, vibration, or accidental pulling. Strengthening the connection can reduce wear and tear on both the connectable device and the receptacle, extending the lifespan of one or both of the connectable device and the receptacle. In applications where a loose connection may pose a safety hazard, such as medical equipment or industrial machinery, enhancing the retention force can mitigate risks relating to such loose connection. The connector retention device may be sized to have a substantially same length of the receptacle and wrap around the receptable to reduce or minimize the space the connector retention device occupies so that the connector retention device may fit in an original enclosure where the receptacle is positioned. The connector retention device (e.g., device 100) can be configured as an add-on that may be conveniently implemented (e.g., by clipping onto an existing receptacle) into existing setups without the need for extensive modifications, making it a cost-effective solution for improving connection stability. One or more retention features disclosed herein may be added to a receptacle (e.g., receptacle 300) without altering or interfering with the existing connection mechanism for a connectable device to be connected to the receptacle. This technology may be employed across various types of connections and industries, making it a valuable tool in numerous contexts. Merely by way of example, the technology may be suitable for providing enhanced retention force in existing receptacles for removably connectable devices including high-definition multimedia interface (HDMI) connections (e.g., in home entertainment systems or professional audio-visual setups), ethernet connectors (e.g., in office and home networks), audio jacks (e.g., in professional audio equipment, musical instruments, and consumer electronics), display port connectors (e.g., in gaming, graphic design, and data analysis), power connectors (e.g., for portable electronic devices, laptops, and certain types of lighting equipment), serial advanced technology attachment (SATA) connectors for data storage (e.g., in desktops, servers, and network attached storage (NAS) systems, micro USB and USB-C, automotive connectors (e.g., in vehicle diagnostic ports, lighting, and sensor connections), medical device connectors (e.g., for patient monitors, diagnostic equipment, and portable medical devices), etc.

EXAMPLES

Some embodiments may implement one or more of the following solutions, listed in clause-format. The following clauses are supported and further described in the embodiments above and throughout this document.

Solution 1. A connector retention device, comprising a retention clip sized and configured to engage a universal serial bus (USB) receptacle including a frame panel; a pair of opposed sidewall engaging panels extending orthogonally from the frame panel each positioned to closely confront a corresponding side portion of the USB receptacle; and a spring tab including a retention arm including a proximal end portion and a distal end portion, wherein the proximal end portion is connected to the frame panel; and the distal end portion has a pair of protrusions each positioned to engage a corresponding spring finger of the USB receptacle; and a lever arm pivotably coupled to the retention arm of the spring tab; and a button component attached to the frame panel and positioned to actuate the lever arm thereby deflecting the retention arm of the spring tab to move the protrusions away from the spring fingers.

Solution 2. The connector retention device of one or more solutions disclosed herein, the button component comprising a base attached to the retention clip; a frame connected to the base; a button supported on the frame; and an extension member connected to the button and carried by the base wherein the button is configured to actuate the lever arm via the extension member.

Solution 3. The connector retention device of one or more solutions disclosed herein, wherein the extension member is carried by the base via a resilient hinge.

Solution 4. The connector retention device of one or more solutions disclosed herein, wherein the frame of the button component is connected to the base via a pair of support sections spaced along a width direction of the retention clip.

Solution 5. The connector retention device of one or more solutions disclosed herein, the retention clip further comprising a pair of mounting tab spaced along the width direction wherein at least one of the support sections has an extension opposing one of the mounting tabs; and the base is attached to the retention clip via the extension and the opposing mounting tab.

Solution 6. The connector retention device of one or more solutions disclosed herein, wherein the extension includes a barbed feature; and the mounting tab that opposes the extension includes an aperture sized to receive the barbed feature to attach the base to the retention clip.

Solution 7. The connector retention device of one or more solutions disclosed herein, wherein the lever arm is configured to be actuated by a force generated by pressing of the button that causes the extension member to engage and apply the force on the lever arm.

Solution 8. The connector retention device of one or more solutions disclosed herein, wherein the base includes an arm aperture through which the lever arm extends to meet the extension member.

Solution 9. The connector retention device of one or more solutions disclosed herein wherein the lever arm is configured to be actuated to pivot downward toward the frame panel (102), causing the retention arm to pivot upward away from the frame panel and thereby disengaging the protrusions from the spring fingers.

Solution 10. The connector retention device of one or more solutions disclosed herein, wherein at least one of the engaging flanges comprises an attachment feature to facilitate attachment of the retention clip to the USB receptacle.

Solution 11. The connector retention device of one or more solutions disclosed herein, wherein the attachment feature comprises at least one of a hook portion or a chamfer.

Solution 12. The connector retention device of one or more solutions disclosed herein, wherein the lever arm extends outward from the retention arm (136) and is configured to receive an actuating force.

Solution 13. The connector retention device of one or more solutions disclosed herein, wherein at least a portion of the retention clip or at least a portion of the button component comprises a resilient material.

Solution 14. The connector retention device of one or more solutions disclosed herein, wherein at least a portion of the retention clip or at least a portion of the button component comprises plastic, aluminum, stainless steel, titanium, copper, or an alloy thereof, carbon fiber reinforced polymers (CFRP), high-impact polystyrene (HIPS), polycarbonate (PC), polyamide, or fiberglass reinforced plastics (FRP).

Solution 15. A USB receptacle, comprising an outer shell housing including a bottom panel including a pair of spring fingers; and a top panel including a spring tab, the spring tab including a retention arm including a proximal end portion and a distal end portion, wherein the proximal end portion is connected to the top panel; and the distal end portion has a pair of protrusions each being configured to engage an aperture of a USB plug connector thereby locking the USB plug connector in the USB receptacle; and a lever arm pivotably coupled to the retention arm of the spring tab to facilitate unlocking the plug connector by pivoting the retention arm of the spring tab to disengage the protrusions from the apertures when actuated.

Solution 16. The USB receptacle of one or more solutions disclosed herein, wherein at least one of the protrusions includes a lance formed in the spring tab.

Solution 17. The USB receptacle of one or more solutions disclosed herein, wherein at least one of the protrusions includes a ramped portion and an edge that is substantially parallel to an edge of the aperture.

Solution 18. The USB receptacle of one or more solutions disclosed herein, wherein the lever arm is movably connected to the top panel via a proximal end portion.

Solution 19. The USB receptable of one or more solutions disclosed herein, wherein the lever arm includes an engagement feature configured to facilitate application of an actuating force to the lever arm.

Solution 20. The USB receptacle of one or more solutions disclosed herein, wherein the engagement feature comprises a through-hole or an indented or embossed region in the lever arm.

Solution 21. A connector retention device, comprising a retention clip sized and configured to engage a receptacle including a frame panel; a pair of opposed sidewall engaging panels extending orthogonally from the frame panel each positioned to closely confront a corresponding side portion of the receptacle; and a spring tab including a retention arm including a proximal end portion and a distal end portion, wherein the proximal end portion is connected to the frame panel; and the distal end portion has a pair of protrusions each positioned to engage a corresponding spring finger of the receptacle; and a lever arm coupled to the retention arm of the spring tab; and a button component attached to the frame panel and positioned to actuate the lever arm thereby deflecting the retention arm of the spring tab to move the protrusions away from the spring fingers.

Solution 22. A receptacle, comprising an outer shell housing including a bottom panel including a pair of spring fingers; and a top panel including a spring tab, the spring tab including a retention arm including a proximal end portion and a distal end portion, wherein the proximal end portion is connected to the top panel; and the distal end portion has a pair of protrusions each being configured to engage an aperture of a plug connector thereby locking the plug connector in the receptacle; and a lever arm coupled to the retention arm of the spring tab to facilitate unlocking the plug connector by pivoting the retention arm of the spring tab to disengage the protrusions from the apertures when actuated.

Solution 23. A connector retention device configured to generate an adjustable retention force for connecting a connectable device with a receptacle as substantially shown and described herein.

Solution 24. A method for connecting or disconnecting a connectable device from a receptacle using a connector retention device as substantially shown and described herein.

Solution 25. A receptacle comprising retention enhancement features as substantially shown and described herein.

Solution 26. A method for connecting or disconnecting a connectable device from a receptacle that includes retention enhancement features as substantially shown and described herein.

Solution 27. A method of manufacturing a retention clip or a receptacle with retention enhancement features as substantially shown and described herein.

CLOSING REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A connector retention device, comprising:

a retention clip sized and configured to engage a universal serial bus (USB) receptacle, comprising:
- a frame panel;
- a pair of opposed sidewall engaging flanges extending orthogonally from the frame panel, each positioned to closely confront a corresponding side portion of the USB receptacle; and
- a spring tab, comprising:
  - a retention arm comprising a proximal end portion and a distal end portion, wherein
    - the proximal end portion is connected to the frame panel; and
    - the distal end portion has a pair of protrusions each positioned to engage a corresponding spring finger of the USB receptacle; and
  - a lever arm pivotably coupled to the retention arm; and a button component attached to the frame panel and positioned to actuate the lever arm thereby deflecting the retention arm to move the protrusions away from the spring fingers.

2. The connector retention device of claim 1, the button component comprising:

a base attached to the retention clip;

a frame connected to the base;

a button supported on the frame; and an extension member connected to the button and carried by the base, wherein the button is configured to actuate the lever arm via the extension member.

3. The connector retention device of claim 2, wherein the extension member is carried by the base via a resilient hinge.

4. The connector retention device of claim 2, wherein the frame of the button component is connected to the base via a pair of support sections spaced along a width direction of the retention clip.

5. The connector retention device of claim 4, the retention clip further comprising a pair of mounting tab spaced along the width direction, wherein:

at least one of the support sections has an extension opposing one of the mounting tabs; and the base is attached to the retention clip via the extension and the opposing mounting tab.

6. The connector retention device of claim 5, wherein:

the extension comprises a barbed feature; and the mounting tab that opposes the extension comprises an aperture sized to receive the barbed feature to attach the base to the retention clip.

7. The connector retention device of claim 2, wherein the lever arm is configured to be actuated by a force generated by pressing of the button that causes the extension member to engage and apply the force on the lever arm.

8. The connector retention device of claim 2, wherein the base comprises an arm aperture through which the lever arm extends to meet the extension member.

9. The connector retention device of claim 1, wherein the lever arm is configured to be actuated to pivot downward toward the frame panel, causing the retention arm to pivot upward away from the frame panel and thereby disengaging the protrusions from the spring fingers.

10. The connector retention device of claim 1, wherein at least one of the engaging flanges comprises an attachment feature to facilitate attachment of the retention clip to the USB receptacle.

11. The connector retention device of claim 10, wherein the attachment feature comprises at least one of a hook portion or a chamfer.

12. The connector retention device of claim 1, wherein the lever arm extends outward from the retention arm and is configured to receive an actuating force.

13. The connector retention device of claim 1, wherein at least a portion of the retention clip or at least a portion of the button component comprises a resilient material.

14. The connector retention device of claim 1, wherein at least a portion of the retention clip or at least a portion of the button component comprises plastic, aluminum, stainless steel, titanium, copper, or an alloy thereof, carbon fiber reinforced polymers (CFRP), high-impact polystyrene (HIPS), polycarbonate (PC), polyamide, or fiberglass reinforced plastics (FRP).

* * * * *